US005526502A

United States Patent [19]

Yoshida et al.

[11] Patent Number: 5,526,502

[45] Date of Patent: Jun. 11, 1996

[54] MEMORY INTERFACE

[75] Inventors: Shinichi Yoshida, Kashihara; Souichi Miyata, Nara; Tsuyoshi Muramatsu, Chiba, all of Japan

[73] Assignee: Sharp Kabushiki Kaisha, Osaka-fu, Japan

[21] Appl. No.: 39,760

[22] Filed: Mar. 30, 1993

[30] Foreign Application Priority Data

Mar. 30, 1992 [JP] Japan .................................... 4-073746

[51] Int. Cl.[6] ............................. G06F 12/10; G06F 3/023

[52] U.S. Cl. ......................... 395/412; 395/427; 395/415; 395/166; 364/238.4

[58] Field of Search .................................... 395/425, 400, 395/166, 412, 415, 427; 364/238.4

[56] References Cited

U.S. PATENT DOCUMENTS 4,130,885 12/1978 Dennis ................................ 364/238.4
4,203,154 5/1980 Lampson et al. .................... 364/238.4
4,480,307 10/1984 Budde et al. ........................ 364/238.4
4,796,221 3/1989 Tokumitsu .............................. 364/900
4,967,274 10/1990 Sonoda .................................... 358/160
4,969,085 11/1990 Desjourdy ............................ 364/238.4
4,972,315 11/1990 Yamasaki et al. ...................... 364/200
5,007,020 4/1991 Inskeep .................................. 364/900
5,119,481 6/1992 Frank et al. ......................... 364/238.4
5,193,149 3/1993 Awiszio et al. ...................... 364/238.4
5,404,539 4/1995 Onozaki ................................. 395/400

OTHER PUBLICATIONS

An Evaluation of Parallel Processing in the Dynamic Data Driven Processor (Japanese Society of Information Processing Engineers of Japan, Microcomputer Architecture Symposium, Nov. 12, 1991).

*Primary Examiner*—Kevin J. Teska
*Assistant Examiner*—Tyrone V. Walker

[57] ABSTRACT

A memory interface device capable of memory accessing suitable for video image signal processing and memory accessing designating an arbitrary address. The interface includes an input scrambler for rewriting the generation number of an input data packet utilizing first data and/or second data when the instruction code of the input data packet is a table conversion instruction, and otherwise outputting the input data packet as it is, and a memory accessing circuit accessing an image memory using the generation number of the applied input data packet as an address and outputting the result of accessing. The device produces and outputs an output data packet from the result of accessing output from the memory accessing circuit and the input data packet.

21 Claims, 12 Drawing Sheets

Rfd,Rtn,Rpx: BASE OFFSET REGISTER VALUE

MEMORY INTERFACE

BACKGROUND OF THE INVENTION

1. Field of the Invention

The present invention relates generally to memory interfaces responsive to an input data packet input from a data-driven type processor for accessing an image memory and outputting the result, and more specifically, to a memory interface responsive to an input data packet which has been output from a dynamic data driven type processor and attached with a generation number which is attached sequentially according to the order of input time for accessing the content of an image memory, for example, using the generation number as an address and outputting the result.

2. Description of the Related Art

In recent years, there have been rising demands for an increase in the operating speed of a processor, for example in the field of image processing. Parallel processing has attracted much attention as one measure for increasing the speed of a processor. Among various architectures suitable for parallel processing, an architecture called data-driven type is especially noticeable.

In a data-driven type processor, processing proceeds based on a simple principle that "a certain processing is performed when all the necessary input data is collected and resources such as operation units necessary for the processing are secured". One of the things technically required for implementing this architecture is a mechanism for detecting when all the necessary input data is collected (firing). An architecture type permitting input of only one set of data for a certain processing when the firing is detected is called a static data driven type, while an architecture permitting input of two or more sets of data is called a dynamic data-driven type.

The static data driven type can not sufficiently cope with the processing of time series data such as a video signal, and therefore it is necessary to employ a dynamic architecture for such data. In this case, since there are a number of input sets for a certain processing, a concept of generation identifiers for identifying these plurality of input sets, for example, should be introduced. Herein, such generation identifiers will be referred to as generation numbers.

One example of such a data-driven type information processing device suitable for image processing is presented in an article titled "An Evaluation of Parallel Processing in the Dynamic Data Driven Process" (Japanese Society of Information Processing Engineers of Japan, Microcomputer Architecture Symposium, Nov. 12, 1991). FIG. 1 is a block diagram showing a data-driven type information processing device suitable for image processing, utilizing a conventional memory interface. Referring to FIG. 1, the data-driven type information processing device includes a data-driven type processor 1 for image processing, an image memory 3, and a conventional memory interface 24.

Input data packets having generation numbers attached according to the order of input time are input in a time-series manner through data transmission paths 7 and 8. Data-driven type processor 1 applies an access (reference to/updating of the content of image memory 3, for example) demand via image memory 3 to memory interface 24 based on a preset processing content through a data transmission path 4. Memory interface 24 accesses an address in image memory 3 corresponding to the address (generation number) included in the input data packet through a memory access control line 6 in response to the access demand, and returns the result to data-driven type processor 1 through a data transmission path 5. Data-driven type processor 1 performs a processing to the input data packet in response to the output of memory interface 24 and outputs an output a data packet through a data transmission path 9 or 10.

FIG. 2 illustrates one example of the field structure of such an input data packet input to memory interface 24 through data transmission path 4. Referring to FIG. 2, the input data packet includes an instruction code 26, a generation number 28, first data 30 and second data 32.

Instruction code 26 represents the content of a processing to the image memory. The content of the processing includes, for example, referring to or updating of the content of image memory 3.

The generation number 28 is an identifier attached to the input data packet applied to data-driven type processor 1 through data transmission path 7 or 8 according to the order of input time series. Data-driven type processor 1 utilizes the generation number for matching at the time of data waiting. Meanwhile, for memory interface 24, the generation number has the same meaning as the address to image memory 3. More specifically, memory interface 24 accesses a corresponding address in image memory 3 based on the generation number.

The first and second data 30 and 32 are interpreted differently according to the content of instruction code 26. For example, if the instruction code 26 represents updating of image memory 3, the first data 30 is data to be written to the image memory and the second data 32 is not utilized and thus is meaningless. When the instruction code 26 represents reference to image memory 3, the first and second data 30 and 32 are both not utilized and thus are meaningless.

In the input data packet shown in FIG. 2, the instruction code 26 is of 8 bits, the generation number 28 is of 24 bits, the first data 30 is of 12 bits, and the second data 32 is also of 12 bits.

Referring to FIG. 3, the field structure of an output data packet output from memory interface 24 through data transmission path 5 is as follows. The output data packet includes an instruction code 34, a generation number 36, and data 38.

For the instruction code 34 of 8 bits and the generation number 36 of 24 bits, the instruction code 26 and the generation number 28 of the input data packet to memory interface 24 shown in FIG. 2 are output as they are. As for the data 38, the result of accessing to image memory 3 is stored. The data 38 is of 12 bits.

FIG. 4 illustrates the structure of the generation number 28 in detail. Referring to FIG. 4, the generation number 28 includes a 3 bit field address FD#, an 11 bit line address LN#, and a 10 bit pixel address PX#.

The generation number 28 shown in FIG. 4 corresponds to the logical configuration of image memory 3 as shown in FIG. 5. The logical configuration of image memory 3 shown in FIG. 5 includes eight field image memories **40*a*–40*h* specified by the 3 bit field address FD#. Each field image memory includes $2^{11}$=2048 lines in the vertical direction corresponding to the 11 bit line address LN#shown in FIG. 4. Each of the lines includes $2^{10}$=1024 pixels corresponding to the 10 bit pixel address PX# shown in FIG. 4**.

A signal input packet has already been attached with a generation number according to the order of input time series when it is input to data-driven type processor for image processing 1 (see FIG. 1). If an address for accessing image memory 3 is decided based on the generation number, the point of accessing moves scanning the memory in the horizontal direction starting from a point in the upper left of the first image memory 40*a*. When scanning for 1 line is completed, the point of access moves to the left end of the line immediately after that line. When scanning is completed as far as a point in the lower right of the first image memory 40*a*, the point of accessing moves to a point in the upper left part of the second image memory 40*b*. Hereinafter the point of accessing moves sequentially scanning image memories 40*b*–40*h*. When scanning is completed as far as a point in the lower right part of the last image memory, the eighth image memory 40*h* in this example, the point of accessing returns to a point in the upper left part of the first image memory 40*a*, and the same operation is repeated thereafter.

Since the memory interface moves the address for accessing the image memory according to the order of input of signal input packets to the data-driven type processor depending upon its purpose, the content of image memory 3 can be processed following scanning of a video image. This is why the memory interface is suitable for video image processing.

Having such a structure, however, the interface suffers from a disadvantage in that it can not designate an arbitrary address and read out its content. This is because such a conventional memory interface depends on the generation number of an input data packet for an address for accessing an image memory. Thus, a table conversion processing, in which a corresponding content in a table previously written in part of an image memory is read out based on the data value of an input data packet, can not be performed in a conventional memory interface.

Furthermore, often in video signal processing, some operation is performed referring to the content of adjacent regions, such as a mask processing in a 3×3 nearby regions, and the result is written in the same field or a different field. However, in a conventional memory interface, an address for accessing an image memory is decided exclusively by the generation number of an input data packet. Accordingly, any processing can not readily be performed referring to the content of an adjacent region as such. This applies to the case in which a processing, such as the above-described mask processing, is performed to the vicinity of an arbitrary pixel.

SUMMARY OF THE INVENTION

It is therefore an object of the invention to provide a memory interface permitting memory accessing suitable for video signal processing and processing similar to video signal processing, designation of an arbitrary address and reading out its content.

Another object of the invention is to provide a memory interface permitting memory accessing suitable for video signal processing and processing similar to video signal processing, a well as writing a table in an arbitrary address in an image memory and reading out its content.

A still further object of the invention is to provide a memory interface permitting memory accessing suitable for video signal processing and processing similar to video signal processing, and memory accessing to be readily performed in the vicinity of an address designated by a generation number.

An additional object of the invention is to provide a memory interface permitting memory accessing suitable for video signal processing and processing similar to video signal processing, and memory accessing around an address having an arbitrary offset to a generation number and in the vicinity of the address.

A memory interface according to the invention accesses a prescribed memory in response to a data packet including at least an instruction code field, an address field, and a data field and outputs the result. The memory interface includes an input terminal for a data packet, a circuit for converting the content of the address field of a received data packet based on an instruction code and data included in the received data packet, and a memory accessing circuit for accessing the converted address in the prescribed memory, performing a processing determined by the instruction code of the received data packet and outputting the result.

Input of an instruction permits the content of the address data field of the data packet to be converted utilizing the content of the data field, thus allowing various ways of accessing to the memory.

The conversion circuit includes a coincidence detection circuit for detecting whether or not the instruction code of a received data packet coincidence with an instruction code and outputting a coincidence detection signal, and a switch for selectively providing the accessing circuit with the content of the address field of the received data packet or the content of the data field as an address, in response to the coincidence detection signal. Even if the content of an address field can not be arbitrarily changed, a desired address in the memory can be accessed by setting the desired address in the data field.

The conversion circuit also includes a coincidence detection circuit for detecting whether or not the instruction code of a received data packet is coincident with a prescribed instruction code, an operation circuit for subjecting the content of the address field of the received data packet and the content of the data field to a prescribed operation such as addition, and a switch for selectively providing the accessing circuit with the content of the address field of the received data packet or the output of the operation circuit in response to the coincidence detection signal. Since the content of the address field can be modified with the content of the data field, a processing in the vicinity of an address specified by the content of the address field can readily be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 6:
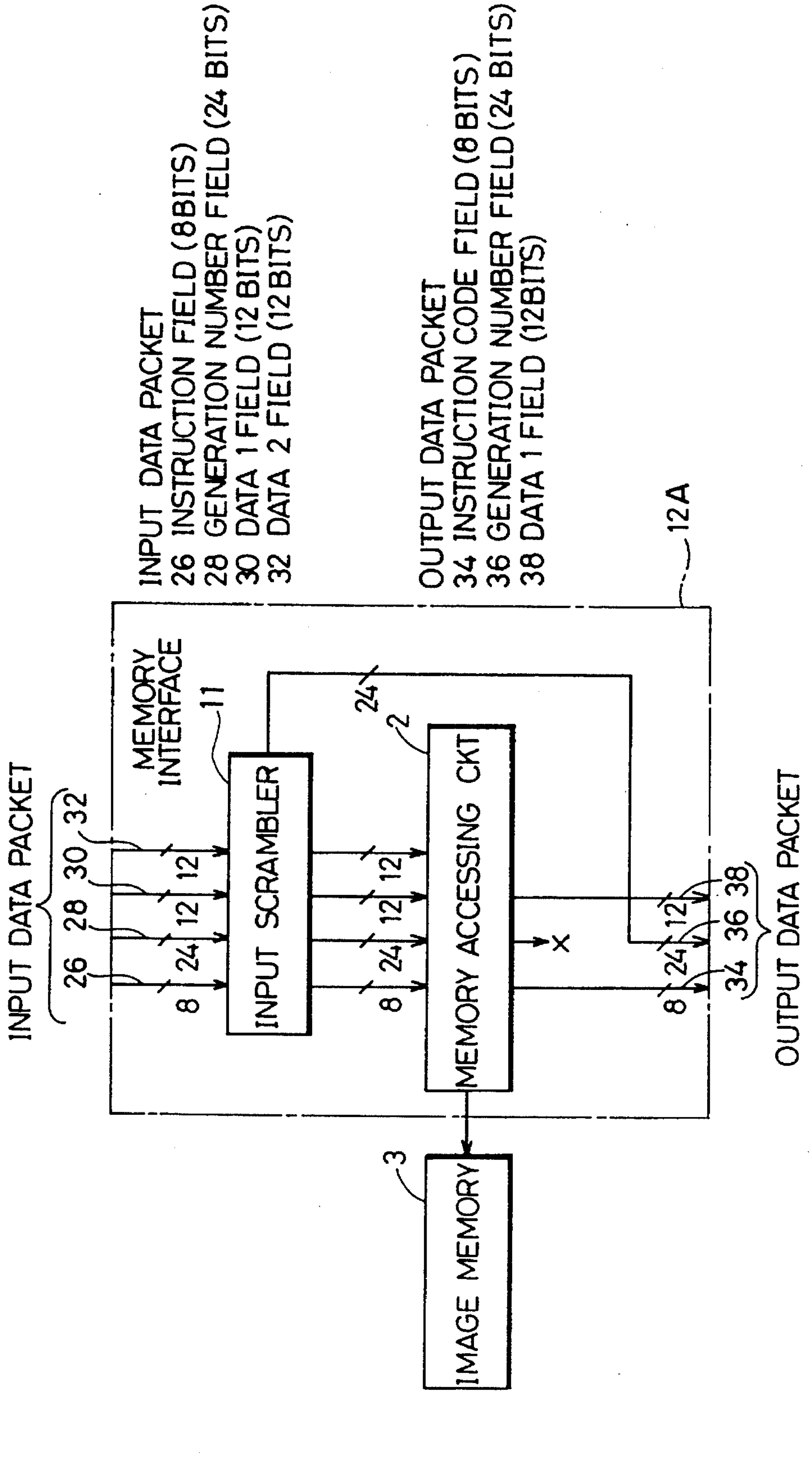
FIG. 6 is a block diagram showing a memory interface according to one embodiment of a memory interface device according to the invention.

FIG. 6 is a block diagram showing one example of a memory interface 12A according to the invention. Memory interface 12A can be incorporated into a system as it is in place of the conventional memory interface 24A shown in FIG. 1. It is noted that this embodiment is described by way of illustration only. Thus various other modifications are possible. For example, the fields of an input data packet and an output data packet, and the structure of each field are not limited to the structure of the embodiment described.

Figure 1:
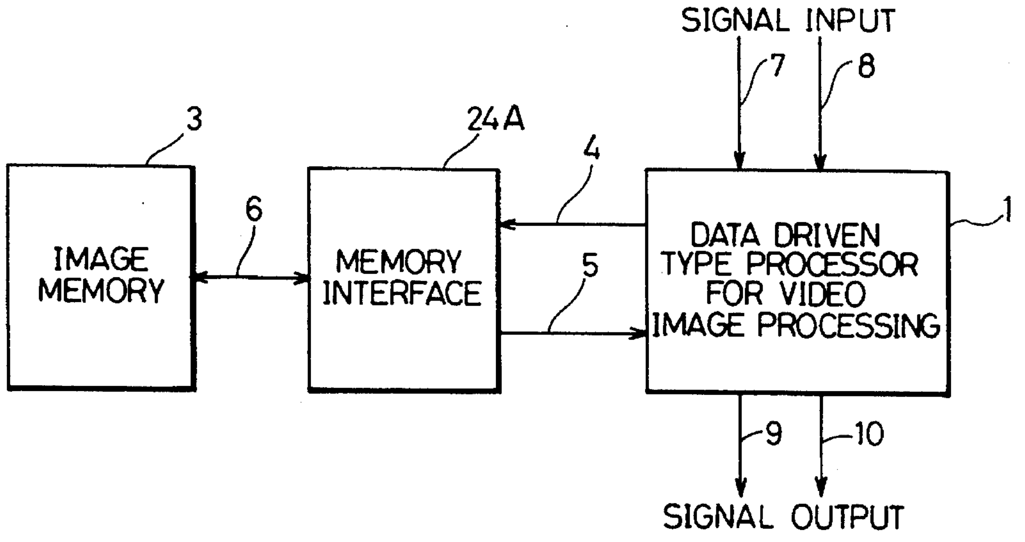
FIG.1 PRIOR ART
FIG. 1 is a system block diagram showing a conventional dynamic data driven type information processing device.
Figure 2:
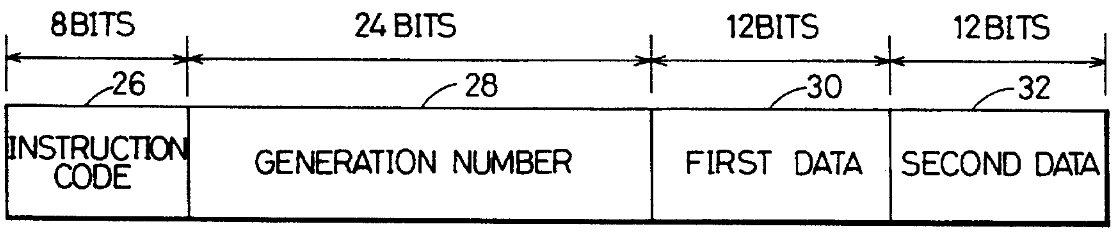
FIG.2 PRIOR ART
FIG. 2 is prior art and schematically shows the field structure of an input data packet to a memory interface.

Referring to FIG. 6, memory interface 12A includes an input scrambler 11 for receiving an input data packet from data driven type processor for video image processing 1 shown in FIG. 1 and switching the content of data for output depending upon the content of the instruction code in the packet, and a memory accessing circuit 2 for accessing a corresponding address in an image memory 3 based on a designated instruction code and outputting the result in a similar manner to the conventional memory interface 24 shown in FIG. 1.

Figure 3:
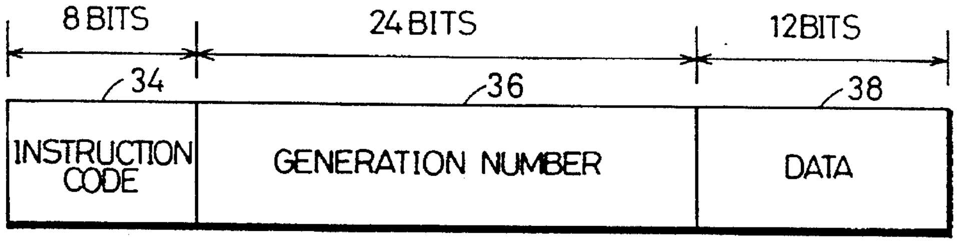
FIG.3 PRIOR ART
FIG. 3 is prior art and shows the structure of an output data packet from a memory interface.
Figure 4:
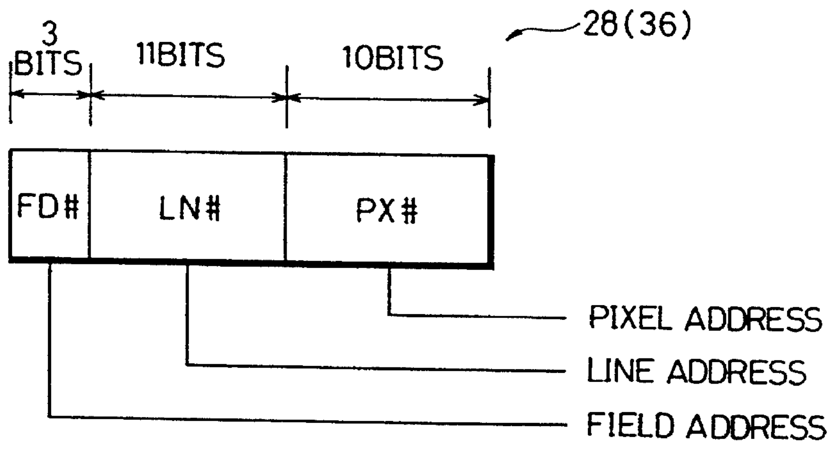
FIG.4 PRIOR ART
FIG. 4 is prior art and shows the structure of a generation number.
Figure 5:
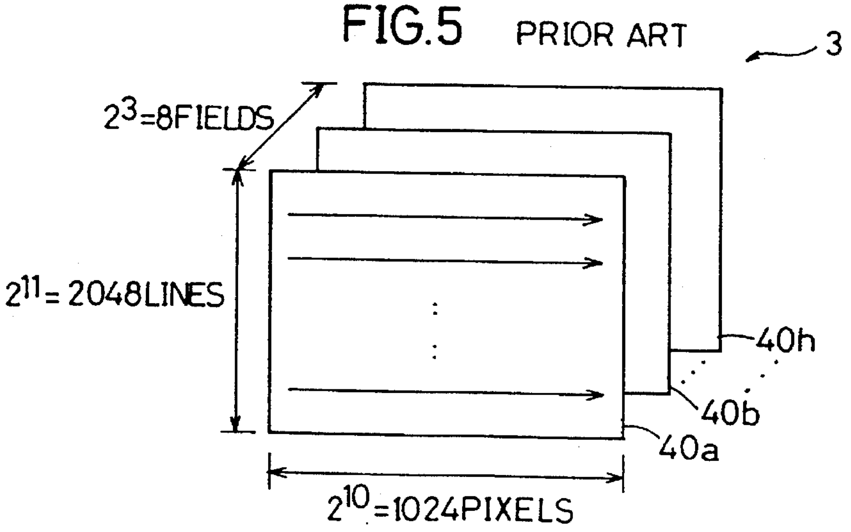
FIG.5 PRIOR ART
FIG. 5 is prior art and schematically shows the structure of an image memory corresponding to the structure of the generation number shown in FIG. 4.

Input scrambler 11 branches a 24 bit generation number field included in the input data packet for output. Memory accessing circuit 2 outputs the instruction code of 8 bits provided from input scrambler 11 as is, together with the result of accessing. Memory interface 12A produces and outputs an output data packet having a field structure as shown in FIG. 3 from the instruction code of 8 bits output from memory accessing circuit 2, the generation number of 24 bits branched from input scrambler 11, and the result of accessing (12 bits) to image memory 3.

Figure 7:
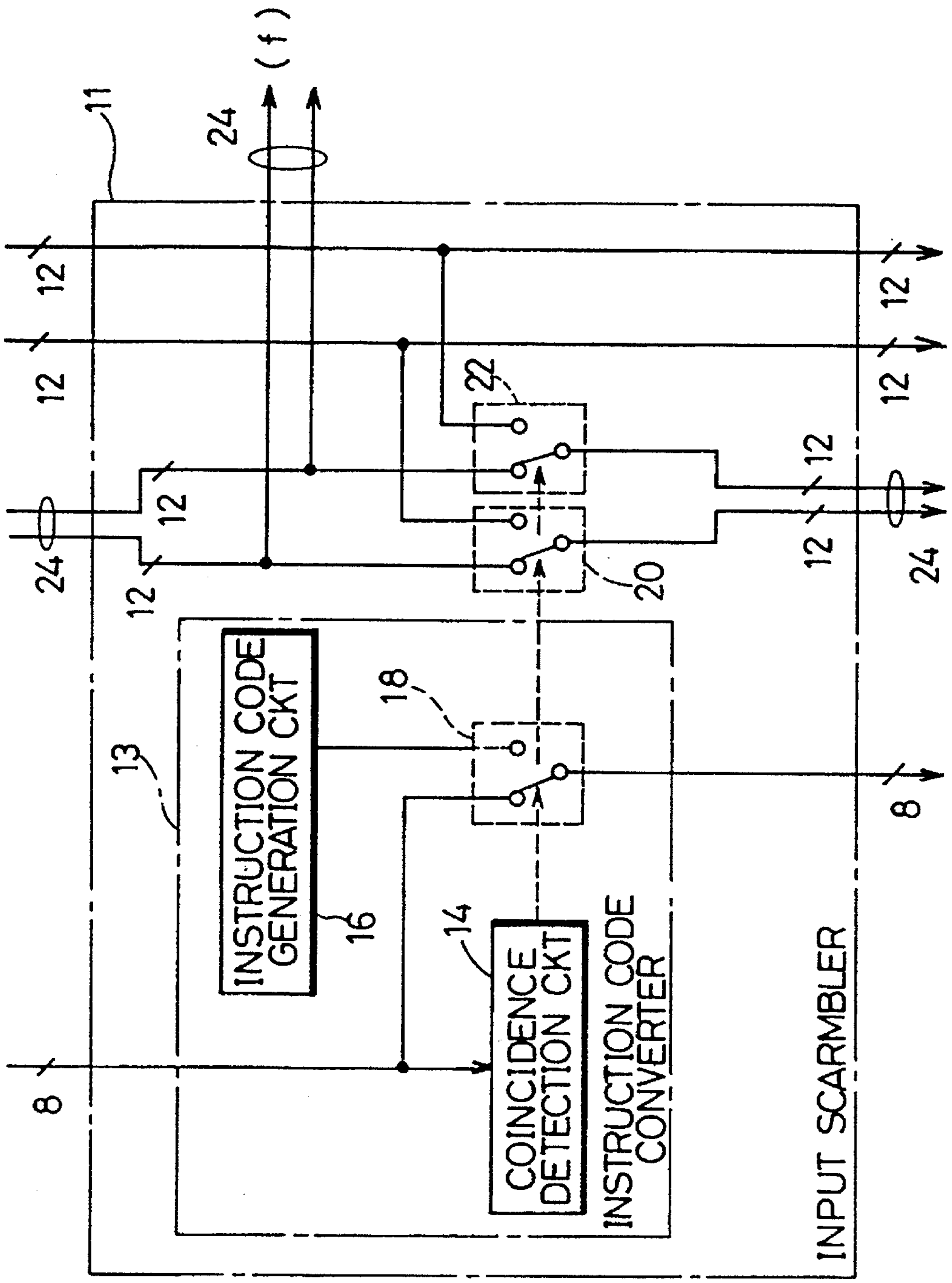
FIG. 7 is a block diagram showing an input scrambler 11 shown in FIG. 6.

Referring to FIG. 7, input scrambler 11 includes an instruction code converter 13 for receiving the 8 bit instruction code in the input data packet and converting the instruction code into an instruction code for image memory reading if it is a table conversion instruction while outputting the instruction code as is, if it is another instruction code, and two switches 20 and 22 controlled by instruction code converter 13.

The uppermost 12 bits of the 24 bit generation number of the input data packet are provided to one input of switch 20. The other input of switch 20 is provided with first data (12 bits) of the input data packet. Similarly, the lowermost 12 bits of the generation number of the input data packet is provided to one input of switch 22, while second data (12 bits) of the input data packet is provided to the other input. Switches 20 and 22 are each controlled by instruction code converter 13 and, if an applied instruction is a table conversion instruction, they output 12 bits in the first and second fields, respectively, and the uppermost 12 bits and the lowermost 12 bits of the generation number, respectively, for another instruction code. The uppermost 12 bits of the generation number output by input scrambler 11 is formed of the output of switch 20, while the lowermost 12 bits is formed of the output of switch 22. Input scrambler 11 (as shown in FIG. 7) branches a 28-bit signal representing the input generation number to output and inputs the result to the output "f" and inputs first and second data representing the uppermost 12 bits and lowermost 12 bits of generation number 28 to switches 20 and 22, respectively. The outputs of switches 20 and 22 are input to memory accessing circuit 2.

Instruction code converter 13 includes a coincidence detection circuit 14 for detecting whether or not the 8 bit instruction code of the input data matches (i.e. is being in coincidence with) a table conversion instruction, an instruction code generation circuit 16 for generating an image memory reading instruction code, and a switch 18 having one input provided with the instruction code of the input data packet and the other input provided with the instruction code generated by instruction code generation circuit 16 and controlled by the detection signal output from coincidence detection circuit 14. The detection circuit output by coincidence detection circuit 14 is used for controlling the operation of switches 20 and 22 as well.

Figure 8:
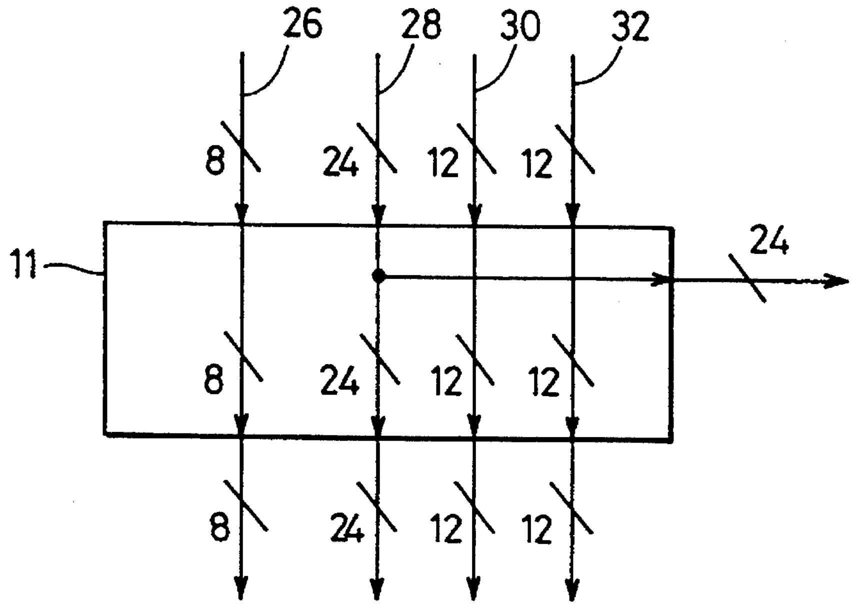
FIG. 8 is a block diagram showing the function of the input scrambler if an instruction code is other than a table conversion instruction.

Memory interface 12A shown in FIGS. 6 and 7 operates as follows. If the instruction code of the input data packet is not the table conversion instruction, coincidence detection circuit 14 does not output a detection signal. Switch 18 selects the instruction code of the input data packet for application to memory accessing circuit 2. Switches 20 and 22 select the uppermost 12 bits and lowermost 12 bits of the generation number of the input data packet, respectively, and output them. Accordingly, input scrambler 11 applies the input data packet to memory accessing circuit 2 as is, as shown in FIGS. 6 and 8, and branches the generation number 28 of the input data packet to form a portion of the output data packet.

Referring to FIG. 6, memory accessing circuit 2 operates exactly the same way as that in the conventional memory interface 24A (see FIG. 1). An address in image memory 3 corresponding to an address in the input data packet input to interface 12A is accessed according to the instruction code of the input data packet and is output. Memory accessing circuit 2 outputs the applied 8 bit instruction code as it is.

The instruction code output from memory accessing circuit 2 is output as is as the instruction code of the output data packet output from memory interface 12A. Therefore, the instruction code coincides with the instruction code of the input data packet. The generation number applied from input scrambler 11 is output as the generation number of the output data packet. Accordingly, the generation 36 coincides with the generation number 28 of the input data packet. Meanwhile, the result of accessing image memory 3 output from memory accessing circuit 2 as the data of the output data packet. Additionally, the input generation number 28 is output from memory accessing circuit 2 unmodified as output "x", for possible use as described in discussing FIG. 16, below. Accordingly, unless the instruction code of the input data packet is a table conversion instruction, memory interface 12A operates exactly in the same way as memory interface 24A shown in FIG. 1 unless the instruction code of the input data packet is a table conversion instruction. It is noted that a circuit identical to the conventional memory interface 24A (see FIG. 1) is used for memory accessing circuit 2, a generation number is also output from memory accessing circuit 2, but such generation number is not used for the output data packet.

Figure 9:
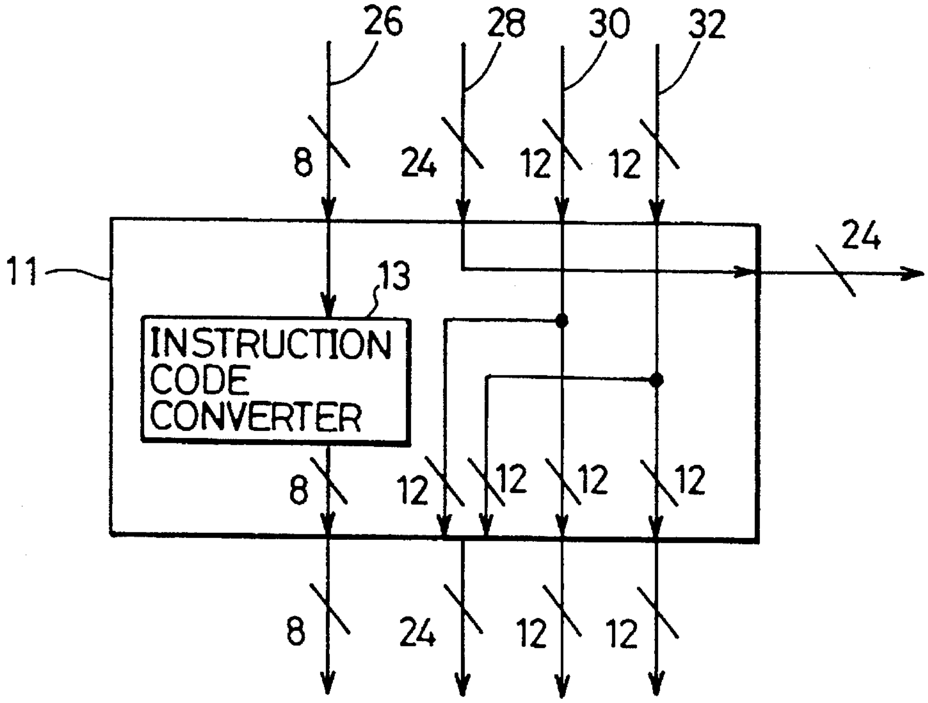
FIG. 9 is a block diagram showing the function of the input scrambler when the instruction code is a table conversion instruction.

If the instruction code of the input data packet represents a table conversion instruction, connections in input scrambler 11 are as follows, and the scrambler 11 operates as a circuit shown in FIG. 9. Coincidence detection circuit 14 detects a coincidence of the instruction code and the table conversion instruction code, and applies a detection signal to switches 18, 20, and 22. Switch 18 selects the image memory reading instruction code applied from instruction code generation circuit 16, and applies the selected instruction code to memory accessing circuit 2 as the instruction code. Switches 20 and 22 select the first data and second data of the input data packet, respectively, in response to the detection signal, and output them as the uppermost 12 bits and the lowermost 12 bits, respectively, of the generation number applied to memory accessing circuit 2. Meanwhile, the generation number 28 of the input data packet is branched to form output (f) which becomes the generation number 36 of the output data packet.

Accordingly, the input data packet applied to memory accessing circuit 2 is formed as follows, when the instruction code is an image memory reading instruction code. The generation number is a generation number composed by the first data and the second data of the input data packet. The first and second data are the first and second data of the input data packet, respectively.

Since memory accessing circuit 2 operates in exactly the same manner as in the conventional memory interface 24A, the following result is obtained. The address of image memory 3 is the generation number applied from input scrambler 11. More specifically, memory accessing circuit 2 accesses image memory 3 utilizing an address whose uppermost 12 bits are the first data and whose lowermost 12 bits are the second data, respectively, of the input data packet applied to memory interface 12. The address is not dependent on the order of input of video signals, and can arbitrarily be set by data driven type processor 1 shown in FIG. 1. Memory accessing circuit 2 accesses image memory 3 according to the address and outputs the result. Memory accessing circuit 2 also outputs the instruction code applied from input scrambler 11, in other words the image memory reading instruction code, "as is".

When the output data packet output from memory interface 12A is produced, the image memory reading instruction code is output for the instruction code 34 shown in FIG. 3, the generation number 28 of the input data packet is output from memory interface 12A as the generation number 36, and the accessing result from image memory 3 is output as the data 38. A generation number output from memory accessing circuit 2 is not utilized for the output data packet.

Therefore, if the instruction code of the input data packet is a table conversion instruction, image memory 3 is accessed utilizing the first and second data of the input data packet as an address. Accordingly, storing a table in a prescribed address in image memory 3 in advance permits address data for referring to the table to be set, and therefore a table conversion function utilizing the table in image memory 3 can be implemented.

As described above, in the memory interface device according to the embodiment, if a table has previously been written in part of the image memory, an address to be accessed can be decided based on the value of data of an input data packet and a corresponding content of the table can be read out. Meanwhile, in the case of an instruction other than such a table conversion instruction, the memory interface device operates exactly in the same manner as a conventional memory interface and can perform image memory accessing suitable for video signal processing.

Figure 10:
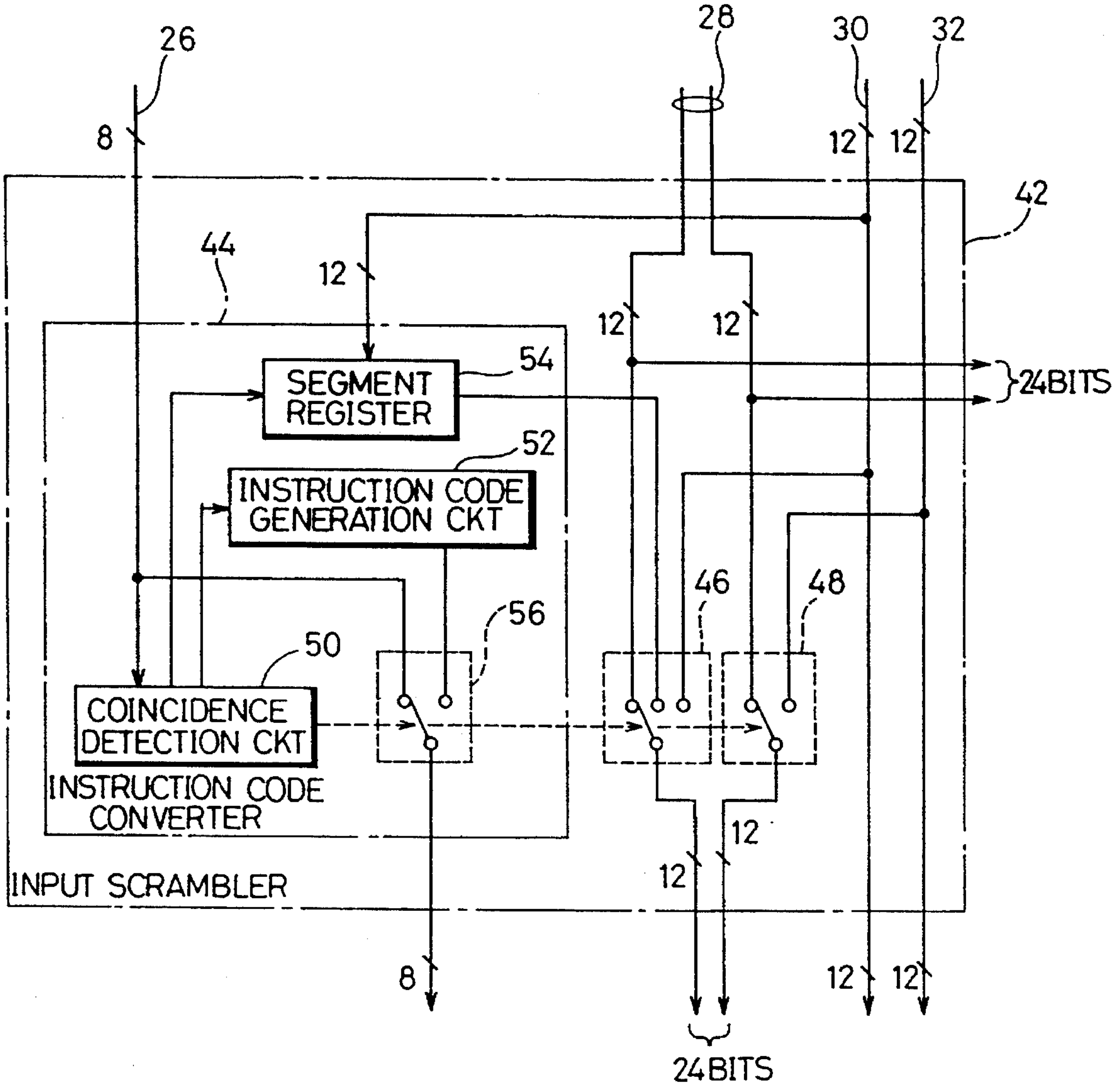
FIG. 10 is a block diagram showing the circuit of the input scrambler of a memory interface device according to a second embodiment of the invention.

FIG. 10 is a block diagram showing an input scrambler in a memory interface device according to a second embodiment of the invention. Input scrambler 42 can be incorporated in memory interface 12A in place of input scrambler 11 12A shown in FIG. 6. Memory interface device 12A having input scrambler 42 incorporated therein in lieu of input scramble 11 (FIG. 6) is characterized in that it can access image memory 3 based on the generation number and read out the data of an arbitrary address as implemented in the first embodiment and, in addition, it can write data in an arbitrary address. Accordingly, when memory interface 12 incorporating input scrambler 42 is utilized, in addition to an instruction code for image memory reading and a table reading (conversion) instruction code as in the first embodiment, for example, a table writing instruction code and an address storage instruction code for table writing as a preparation for writing are prepared.

The address storage instruction code is an instruction to have part of an address for writing stored in input scrambler 42 prior to writing data to an arbitrary address. The part of the address is applied to input scrambler 42 through first data 30 (12 bits), for example, stored and held at input scrambler 42.

The table writing instruction is an instruction to designate writing of input data as the first data 30 in an address in the image memory whose upper 12 bits are the 12 bit first data stored in input scrambler 42 and whose lowermost 12 bits are applied by second data 32. At the time of reading, as is the case with the first embodiment, the image memory can be accessed with the address with the first data 30 and the second data 32 being the uppermost 12 bits and the lowermost 12 bits thereof, respectively.

Referring to FIG. 10, input scrambler 42 includes: instruction code converter 44 for determining whether the instruction code 26 of an input data packet is a table writing instruction, an address storage instruction for table writing, or a table reading instruction; for rewriting the instruction code, if necessary, depending upon the kind of the instruction; and for outputting a prescribed coincidence detection signal. Switches 46 and 48 are controlled by the coincidence detection signal output by code converter 44.

Instruction code converter 44 includes: a coincidence detection circuit 50 for detecting whether or not the instruction code is in coincidence with any of the table reading instruction, address storage instruction, and table writing instruction; a segment register 54 for storing the first data 30 and applying its value to a second input of switch 46, when coincidence detection circuit 50 detects a coincidence with the address storage instruction; an instruction code generation circuit 52 for generating a usual (i.e. image memory) reading instruction, a no operation instruction, and a usual writing instruction, respectively, when coincidence detection circuit 50 detects a coincidence between the instruction code and any of the table reading instruction, address storage instruction; and table writing instruction, and a switch 56 having one input provided with the instruction code 26, and the other input with the output of instruction code generation circuit 52 and controlled by coincidence detection circuit 50 for selectively outputting as an instruction code the instruction code 26 when it is an image memory instruction code, and the output of instruction code generation circuit 52 when the code is any of the table reading instruction, address storage instruction, and table writing instruction.

Switch 46 has three inputs. The first input is provided with the uppermost 12 bits of the generation number 28 of the input data packet, the second input with the output of segment register 54, and the third input with the first data 30. Switch 46 selectively outputs as the uppermost 12 bits of an address the third input when coincidence detection circuit 50 detects a coincidence with the table reading instruction, the second input when a coincidence with the table writing instruction is detected, and the first input when no coincidence is detected with any of the instructions.

Switch 48 has two inputs. One input is provided with the lowermost 12 bits of the generation number 28 of the input data packet. The other input is provided with the second data 32 of the input data packet. Switch 48 selectively outputs, as the lowermost 12 bits of an address, the second input when coincidence detection circuit 50 detects a coincidence with the table writing instruction or the table reading instruction, and the first input otherwise.

Input scrambler 42 shown in FIG. 10 and the memory interface 12 shown in FIG. 6 including input scrambler 42 operate as follows. Hereinafter, the operation of input scrambler 42 at the time of a usual instruction, at the time of writing table data, and at the time of table data reading will be described separately in this order.

(1) When a usual instruction is applied to input scrambler 42 as the instruction code 26 of an input data packet, input scrambler 42 operates as follows. Coincidence detection circuit 50 switches the switches 56, 46, and 48 to select the respective first input. Coincidence detection circuit 50 does not cause segment register 54 and instruction code generation circuit 52 to perform a particular operation. Connecting switches 56, 46, and 48 in this manner permits the function of input scrambler 42 to be equivalent to FIG. 8 shown in conjunction with the first embodiment. In this case, input scrambler 42 will apply the input data packet as is to the memory accessing circuit. Memory interface 12A shown in FIG. 6 operates exactly the same way as a conventional memory interface.

(2) Data writing can be divided into two stages. The first stage is to have the uppermost 12 bits of a writing address stored in segment register 54. The second stage is to produce a writing address by combining the uppermost 12 bits of the address stored in segment register 54 and the second data 32 of the input data packet and writing the first data in the resultant writing address. Hereinafter, the address storing and data writing will be described separately in this order.

For the address storing, an address storing instruction is applied as the instruction code 26 of the input data packet. Coincidence detection circuit 50 detects a coincidence between the input instruction code and the address storing instruction and operates as follows. Coincidence detection circuit 50 switches switch 56 to the second input. Switch 46 is switched to the first input. Switch 48 is also switched to the first input. It is noted that at that time memory accessing circuit 2 shown in FIG. 6 does not perform a memory accessing operation as will be described later, and therefore addresses output from switches 46 and 48 are meaningless. Therefore, the connections of switches 46 and 48 may be in any which way.

Coincidence detection circuit 50 applies a coincidence detection signal to segment register 54, and makes segment register 54 store the first data 30 (12 bits) of the input data packet. The 12 bit data corresponds to the uppermost 12 bits of the writing address. Coincidence detection circuit 50 applies a coincidence detection signal to instruction code generation circuit 52 and has a no operation instruction generated. The no operation instruction is applied to the second input of switch 56 and thus applied to memory accessing circuit 2 (see FIG. 6) as an instruction code from input scrambler 42.

Figure 11:
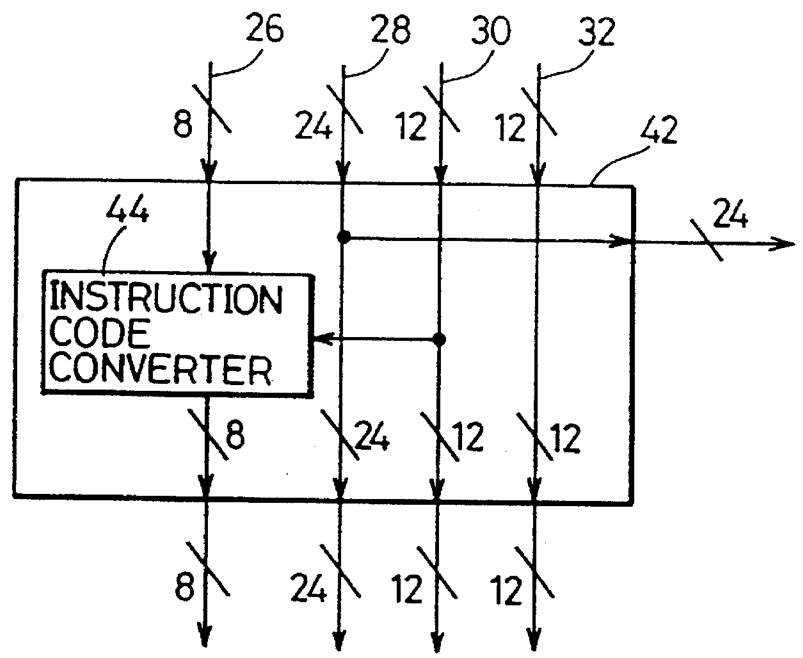
FIG. 11 is a block diagram schematically showing the function of the input scrambler shown in FIG. 10 at the time of address storage.

Therefore, the connection of input scrambler 42 at that time is equivalent to that shown in FIG. 11. As illustrated in FIG. 11, the instruction code 26 is converted into a no operation instruction for output by instruction code converter 44. The 24 bit generation number 28 is output as is. The first data 30 and the second data 32 are similarly output as they are, and first data 30 is applied to instruction code converter 44 and held therein. It is noted that, at that time, since the address storing instruction is as described above converted into the no operation instruction and then applied to the memory accessing circuit, the memory accessing circuit does not access the image memory.

The table writing instruction is executed as follows. Coincidence detection circuit 50 detects a coincidence between the instruction code 26 and the table writing instruction, and switches switch 56 to the second input, switch 46 to the second input, and switch 48 to the second input. Coincidence detection circuit 50 applies a coincidence detection signal representing that the table writing instruction has been detected to instruction code generation circuit 52. Instruction code generation circuit 52 generates and applies a usual writing instruction to the second input of switch 56, in response to the coincidence detection signal. The second input of switch 46 is provided with the uppermost 12 bits of an address set from segment register 54, in response to the address storing instruction.

Figure 12:
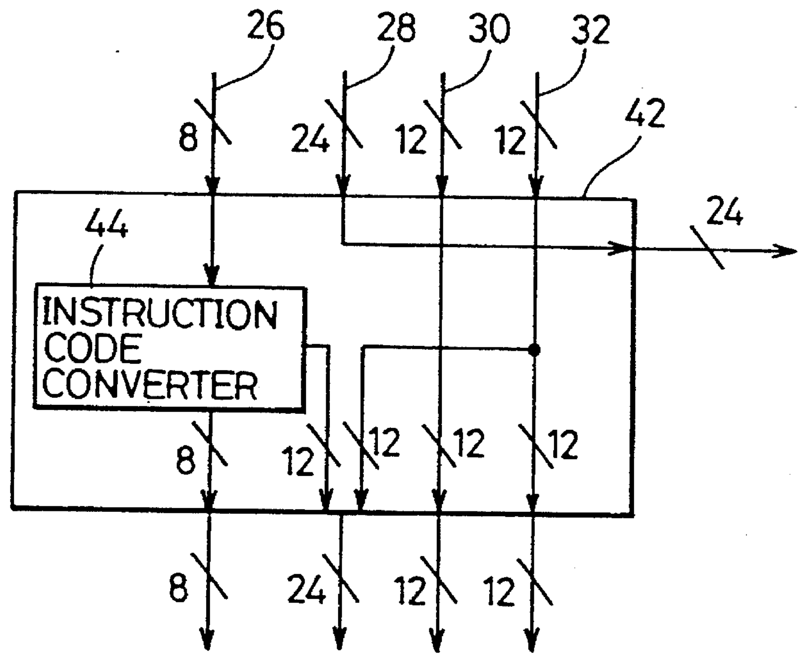
FIG. 12 is a block diagram schematically showing the function of the input scrambler shown in FIG. 10 at the time of data writing.

Accordingly, the connection of input scrambler 42 at the time is equivalent to that shown in FIG. 12. Referring to FIG. 12, the table writing instruction applied as the instruction code 26 is converted into a usual writing instruction for output by instruction code converter 44. The generation number 28 is branched "as is" for output and becomes the generation number of the output data packet as illustrated in FIG. 6. The first data 30 is output as it is. The second data 32 is branched as the lowermost 12 bits of the address. The uppermost 12 bits of the writing address stored in response to the address storing instruction is output from the segment register 54 of instruction code converter 44 (see FIG. 10). A 24 bit address is produced from the above-described 12 bit signal from register 54 and the 12 bit signal from the second data 32 and the produced address is applied to memory accessing circuit 2 shown in FIG. 6.

Accordingly, in this case, input scrambler 42 is provided with the uppermost 12 bits of the writing address as the first data 30 together with the memory storing instruction, and the lowermost 12 bits of the table writing address as the second data 32 and data to be written as the first data 30 together with the table writing instruction, and as a result data designated by the first data 30 can be written in a desired address.

(3) At the time of reading, the connection of input scrambler 42 is as follows. Coincidence detection circuit 50 detects a coincidence between the instruction code 26 and the table reading instruction and switches 56, 46, and 48 to the second input, the third input, and the second input, respectively. Coincidence detection circuit 50 applies a coincidence detection signal representing a coincidence with the table reading instruction to instruction code generation circuit 52. Instruction code generation circuit 52 generates a usual reading instruction different from the table reading instruction, in response to the coincidence detection signal and applies the resultant signal to the second input of switch 56. As described above, the first data 30 and the second data 32 of the input data packet are applied to the third input of switch 46 and the second input of switch 48, respectively. Therefore, in this case, input scrambler 42 is equivalent to input scrambler 11 in the first embodiment shown in FIG. 9.

Therefore, by providing input scrambler 42 with the table reading instruction as the instruction code 26, and the uppermost 12 bits and lowermost 12 bits of the table reading address as the first data 30 and the second data 32, respectively, data can be read out from an address designated by the 24 bits of the first data and second data. Accordingly, the table reading instruction can readily be executed.

The use of the memory interface utilizing input scrambler 42 permits not only data reading from an arbitrary address but also data writing into an arbitrary address to be readily performed. Furthermore, if the instruction code of an input data packet is not any of the table reading instruction, address storing instruction, and table writing instruction, an address designated by the generation number of the input data packet can be accessed. Accordingly, an operation suitable for usual video image signal processing can also be performed.

Figure 13:
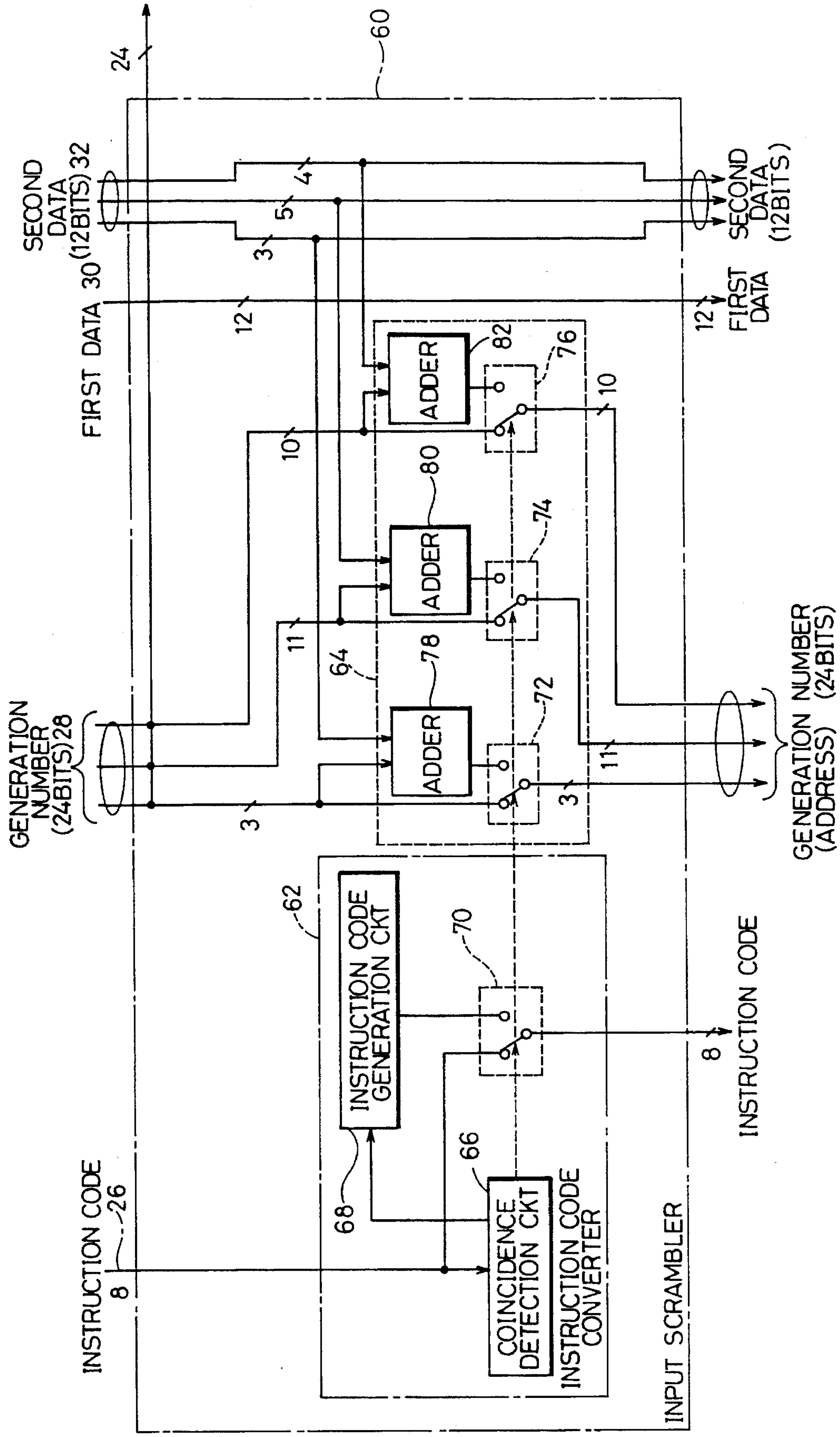
FIG. 13 is a block diagram showing the circuit of an input scrambler for use in a memory interface device according to a third embodiment of the invention.

FIG. 13 is a block diagram showing an input scrambler 60 for use in a memory interface device according to the third embodiment of the invention. Input scrambler 60 can be directly used in memory interface 12 in place of input scrambler 11 of memory interface 12 according to the first embodiment shown in FIG. 6. The memory interface according to the third embodiment is characterized in that accessing (reading/writing) to the vicinity of an address specified with the generation number of an input data packet can readily be performed. Such vicinity reading processing and vicinity writing processing can be implemented by preparing and applying to input scrambler 60 a specific vicinity reading instruction and a specific vicinity writing instruction as an instruction code 26.

Referring to FIG. 13, input scrambler 60 includes an instruction code converter 62 for detecting whether or not the instruction code 26 of an input data packet is in coincidence with the vicinity reading instruction or the vicinity writing instruction and converting the input instruction code into another prescribed instruction code for output upon a coincidence being found, or otherwise outputting the input instruction code "as is". Input scrambler 60 includes an address shift circuit 64 controlled by instruction code converter 62 for adding the second data 32 of the input data packet to the generation number 28 of the input data packet based on a formula as an offset amount and outputting the result, if the vicinity reading instruction or the vicinity writing instruction is detected.

Instruction code converter 62 includes a coincidence detection circuit 66 for detecting whether or not the instruction code 26 of the input data packet is in coincidence with the vicinity reading instruction or the vicinity writing instruction, an instruction code generation circuit 68 responsive to a coincidence detection signal from coincidence detection circuit 66 for generating any of a plurality of instruction codes, a switch 70 controlled by coincidence detection circuit 66 for outputting the output of instruction code generation circuit 68 if the vicinity reading instruction or the vicinity writing instruction is detected, or for outputting the instruction code 26 of the input data packet as is, otherwise.

Address shift circuit 64 includes three switches 72, 74, and 76 and three adders 78, 80, and 82. One input of adder 78 is provided with the uppermost 3 bits of the generation number 28, and the other input is provided with the uppermost three bits-of the second data 32 of the second data packet. One input of adder 80 is provided with the middle (4th–14th) 11 bits of the generation number 28, and the other input is provided with the middle (4th–8th) 5 bits of the second data 32. One input of adder 82 is provided with the lowermost 10 bits of the generation number 28 and the other input with the lowermost 4 bits of the second data 32. The respective first inputs of switches 72, 74, and 76 are provided with the 1st–3rd 3 bits, the 4th–14th 11 bits, and the lowermost 10 bits of the generation number 28, respectively. The respective second inputs of switches 72, 74, and 76 are provided with the outputs of adders 78, 80, and 82, respectively. Switches 72, 74, and 76, as is the case with switch 70, selectively apply to memory accessing circuits 2 (see FIG. 6) as a generation number (address) the first input when a usual instruction is detected by the coincidence detection circuit and the second input when the vicinity reading/vicinity writing instruction is detected.

Hereinafter, the operations of input scrambler 60 when a usual instruction code is input or when the vicinity reading instruction is input will be sequentially described.

When a usual instruction code is input, the connection of input scrambler 60 is as follows. Coincidence detection circuit 66 controls switch 70 to output the input instruction code as it is. Each of the switches 72, 74, and 76 is similarly controlled to the upper 3 bits, middle 11 bits, and the lowermost 10 bits of the input generation number, respectively as they are. As is the case with the first embodiment, the uppermost 3 bits of the generation number 28 represents a field address, the middle 11 bits a line address and the lowermost 10 bits a pixel address. Input scrambler 60 is equivalent to that shown in FIG. 8 described in conjunction with the first embodiment. The operation of memory interface 12 (see FIG. 6) is the same as the image memory accessing operation in the first embodiment. Therefore, the detailed descriptions will not be repeated here.

Figure 14:
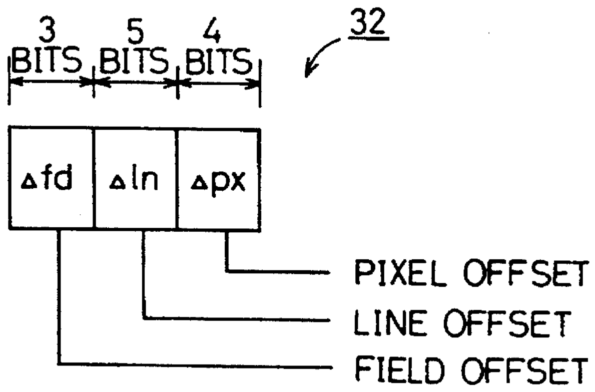
FIG. 14 schematically shows an offset structure.

When a vicinity reading instruction is input, input scrambler 60 operates as follows. It is assumed that the data having a structure as shown in FIG. 14 is input as the second data 32. Referring to the FIG. 14, the second data 32 is formed of 12 bits in total, in other words the uppermost 3 bits, middle 5 bits and lowermost 4 bits. The uppermost 3 bits represents a field offset. The middle 5 bits represents a line offset. The lowermost 4 bits represents a pixel offset.

When the vicinity reading instruction is applied as the instruction code 26, coincidence detection circuit 66 applies a coincidence detection signal to instruction code generation circuit 68. Instruction code generation circuit 68 generates and applies a usual reading instruction to switch 70, in response to the coincidence detection signal. Switch 70 is controlled by coincidence detection circuit 66 to selectively output the output of instruction code generation circuit 68 as the instruction code.

Figure 15:
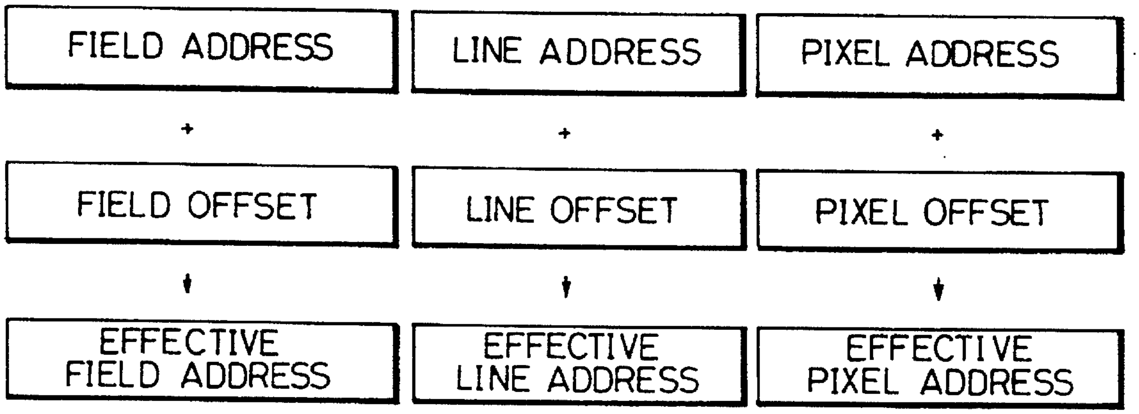
FIG. 15 schematically shows a way of calculating an effective address.

Switches 72, 74, and 76 each controlled to output the second input. These respective second inputs are provided with the outputs of adders 78, 80, and 82. Adder 78 adds the uppermost 3 bits of the generation number 28 and the uppermost 3 bits of the second data 32 and outputs the result. Adder 80 adds the middle 11 bits of the generation number 28 and the middle 5 bits of the second data 32 and outputs the result. Adder 82 adds the lowermost 10 bits of the generation number 28 and the lowermost 4 bits of the second data 32 and outputs the result. It should be noted that adder 78 deals with the uppermost 3 bits of the second data 32 as a signed integer. Adders 80 and 82 also deal with inputs applied from the second data 32 as a signed integer. Accordingly, as illustrated in FIG. 15, the 3 bit, 11 bit, and 10 bit signals output from switches 72, 74, and 76 represent addresses each in a vicinity position apart from the address represented by the generation number 28 of the input data packet by the amount of the field offset, line offset, and pixel offset represented by the second data 32, respectively. Thus, the shifted addresses are applied to memory accessing circuit 2 shown in FIG. 6 as a generation number. Therefore, in this case, memory accessing circuit 2 accesses image memory 3 utilizing as an address the value produced by adding the corresponding offset amount applied as the second data 32 to the field address, line address, and pixel address of the generation number 28 originally applied to memory interface 12.

Figure 16:
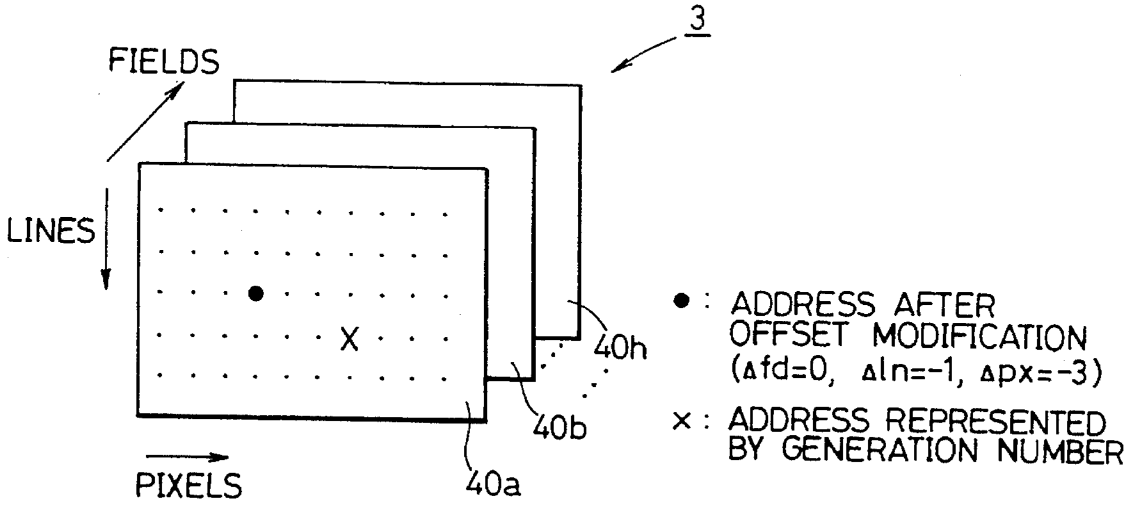
FIG. 16 schematically shows how a memory accessing is performed by offset modification.

One example of the offset-modified address at this time is illustrated in FIG. 16. In the example shown in FIG. 16, the field offset Δfd is set to 0, the line offset Δ1n is set to −1, and the pixel offset Δpx is set to −3. Thus, since an address "x" output from memory accessing circuit 2 (as shown in FIG. 6.) and representing generation number can be offset-modified by the offsets of the second data 32, accessing to the vicinity of a prescribed address can readily be performed. Similarly, a vicinity writing instruction can be executed.

Figure 17:
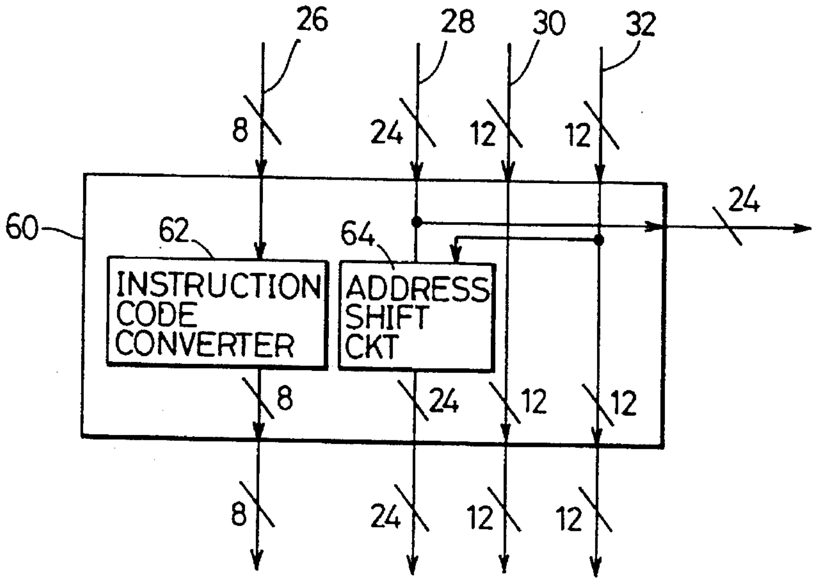
FIG. 17 is a block diagram schematically showing the function of the input scrambler shown in FIG. 13 at the time of address modification.

Input scrambler 60 when the vicinity reading instruction is input is equivalent to that in FIG. 17. Referring to FIG. 17, input scrambler 60 rewrites by instruction code converter 62 an input vicinity reading instruction into a usual reading instruction and an input vicinity writing instruction into a usual writing instruction. In the case of the vicinity reading instruction and the vicinity writing instruction, address shift circuit 64 adds the uppermost 3 bits, middle 5 bits, and lowermost 4 bits of the second data 32 while regarding them as signed integers, respectively, to the uppermost 3 bits, middle 11 bits, and the lowermost 10 bits of the generation number 28 of an input data packet, and outputs the result as an offset modified address. The first data 30 and the second data 32 are applied to memory accessing circuit 2 as they are. The generation number 28 is once again branched and becomes the generation number of an output data packet.

In order to make input scrambler 60 equivalent to the circuit shown in FIG. 17, if the memory interface according to the third embodiment is utilized, by applying a central address as the generation number 28, an offset amount from the central address as the second data 32, and a vicinity reading instruction as the instruction code 26, an address having a prescribed offset with respect to the central address can be accessed.

The table writing instruction can be executed exactly the same way as the vicinity reading processing except that writing data is applied as the first data 30.

Figure 18:
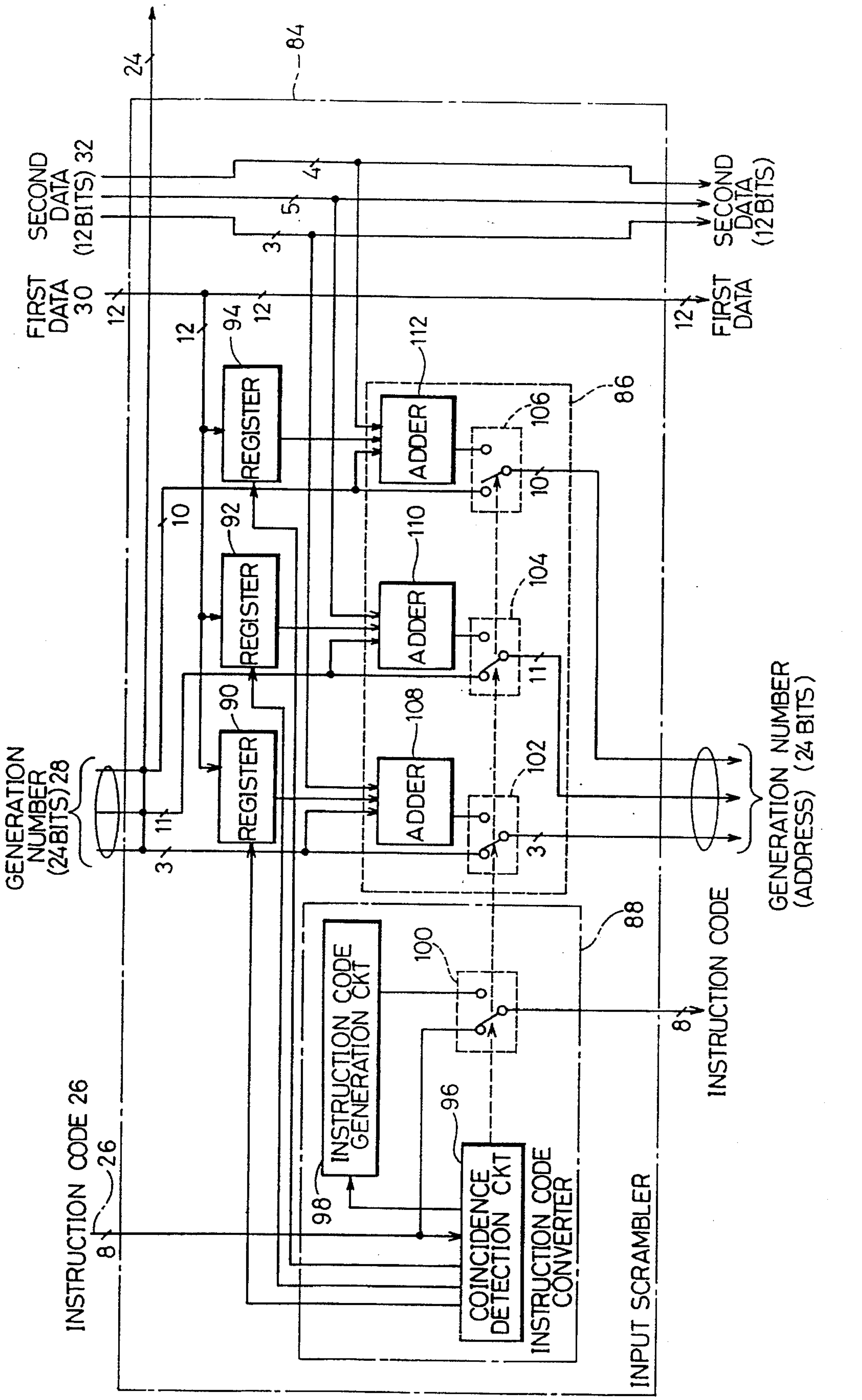
FIG. 18 is a block diagram showing the structure of an input scrambler in a memory interface device according to a fourth embodiment of the invention.

In the above-described third embodiment, a processing to the vicinity of-a generation number with the generation number the center can be performed. The vicinity processing, however, is not necessarily limited to one around the position represented by the generation number. If the vicinity processing were capable of being performed not only around an address represented by a generation number but also around an address having an arbitrary offset to the address represented by the generation number, this would be convenient for image processing. FIG. 18 is a block diagram showing an input scrambler for use in a memory interface according to a fourth embodiment of the invention as such. Input scrambler 84 can directly be used in memory interface 12A as shown in FIG. 6 in place of input scrambler 11.

Figure 19:
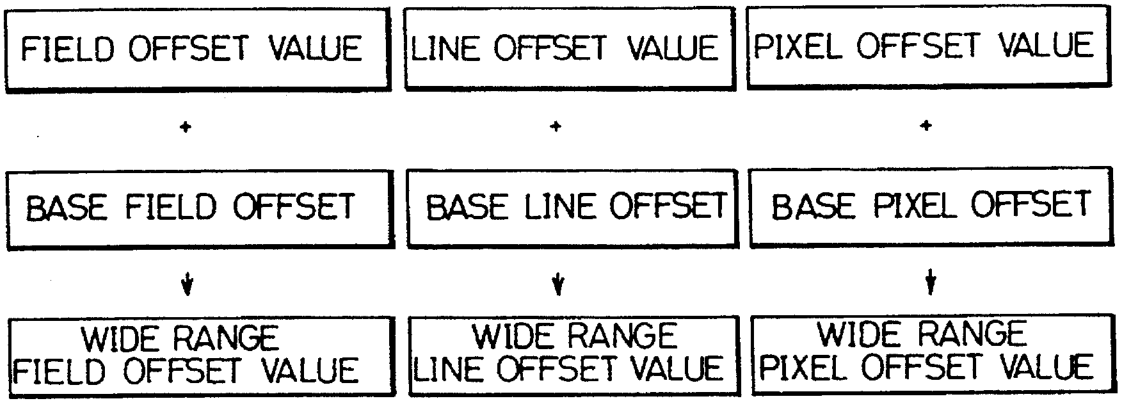
FIG. 19 is a representation schematically showing a way of calculating a wide range field offset value, a wide range line offset value, and a wide range pixel offset value according to the fourth embodiment.
Figure 20:
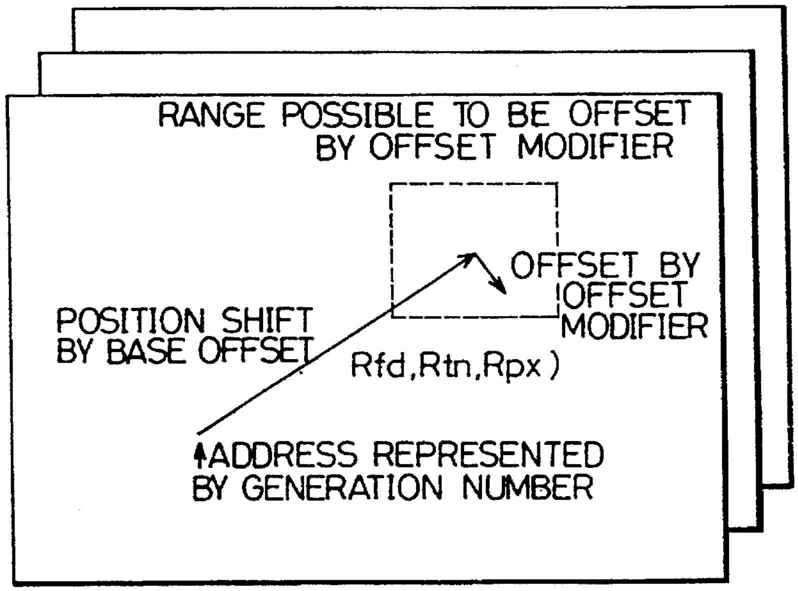
FIG. 20 shows how a memory accessing is performed according to the fourth embodiment.

Input scrambler 84 shown in FIG. 18 is firstly characterized by its possibility of presetting a prescribed offset amount (base offset) to a generation number. Input scrambler 84 is further characterized in that the second data 32 of an input data packet can be used as an offset amount for specifying an address in the vicinity around an address added with the base offset. Three kinds of base offsets, in other words base field offset, base line offset, and base pixel offset can be prepared corresponding to the fact that an address in image memory 3 is specified by a field address, a line address, and a pixel address. In order to enable a vicinity processing around an address added with the offsets, a field offset value, a line offset value, and a pixel offset value are set as with the case of the third embodiment. As illustrated in FIG. 19 the value produced by adding the field offset value and base field offset value becomes a wide range field offset. The value produced by adding the line offset value and the base line offset value becomes a wide range line offset value. The value produced by adding the pixel offset value and the base pixel offset value becomes a wide range pixel offset value. Thus, as illustrated in FIG. 20, after position shifting is performed from the address represented by the generation number, offsetting as specified by the field offset, line offset, and pixel offset is performed, thereby permitting the vicinity processing around address subjected to the base offset.

As described above, since there are the three kinds of base offset values (in other words the values for base field offset), base line offset, and base pixel offset, input scrambler 84 has three registers corresponding to these offset values. Three kinds of base offset storing instructions are prepared in order to set base offset values in these three registers. More specifically, there are a base field offset storing instruction, a base line offset storing instruction, and a base pixel offset storing instruction.

Referring to FIG. 18, input scrambler 84 includes an instruction code converter 88 for detecting whether or not the instruction code 26 is in coincidence with any of the above-described three base offset storing instructions, the wide range offset reading instruction, and wide range offset writing instruction and, if necessary, converting the instruction code for output, three registers 90, 92, and 94 for storing bits 1–3,4–8, and 9–12, respectively of first data 30 under the control of instruction code converter 88 and an address shift circuit 86 controlled by instruction code converter 88 for outputting the generation number 28 "as is" in the case of no coincidence and for outputting as a new generation number, when coincidence with any of the above are determined, a number formed using the old generation number, the first data 30 and the second data 32 as follows. The uppermost 3 bits (bits 1–3) of the new generation number are formed by adding the uppermost 3 bits of the old generation number, the field offset value (bits 1–3 of first data 30 stored in register 90) and the base field offset (bits 1–3 of second data 32). The middle 11 bits (bits 4–14) of the old generation number are added with the line offset value (bits 4–8 of first data 30) and with the base line offset (bits 4–8 of second data 32) so as to form the middle 11 bits of the new generation number. The lowermost 10 bits (bits 15–24) of the old generation number are added with the pixel offset value (bits 9–12 of first data 30) and with the base pixel offset (bits 9–12 of second data 32) so as to form the lowermost 10 bits of the new generation number.

Instruction code converter 88 includes a coincidence detection circuit 96, an instruction code generation circuit 98, and a switch 100. Coincidence detection circuit 96 detects whether or not the instruction code 26 is in coincidence with any of the above-described three base offset storing instructions, wide range offset reading instruction, or wide range offset writing instruction. Instruction code generation circuit 98 generates a no operation instruction when coincidence detection circuit 96 detects a coincidence with any of the above-described three kinds of base offset storing instructions, a usual reading instruction when a coincidence with the wide range offset reading instruction is detected, and a usual writing instruction when a coincidence with the wide range offset writing instruction is detected, and applies the generated instruction to the second input of switch 100. The first input of switch 100 is provided with the instruction code 26. Switch 100 selectively outputs the output of instruction code generation circuit 98 when coincidence detection circuit 96 detects a coincidence with any of the above-described three base offset storing instruction, wide range offset reading instruction, or wide range offset writing instruction; otherwise it outputs the input instruction code 26.

Address shift circuit 86 includes switches 102, 104, and 106, and 3-input adders 108, 110, and 112.

Adder 108 has its first input provided with the uppermost 3 bits of the generation number 28, its second input with the uppermost 3 bits of register 90, and its third input with the uppermost 3 bits of the second data 32. Adder 108 adds these three input values (regarding them as signed integers) and applies the result of addition to the second input of switch 102. The first input of switch 102 is provided with the uppermost 3 bits of the generation number 28. Switch 102 selectively outputs the 3 bits output of adder 108 when coincidence detection circuit 96 detects a coincidence with any of the above described three base offset storing instructions, the wide range offset reading instruction, or the wide range offset writing instruction; otherwise it outputs the uppermost 3 bits of the input generation number 28.

The first input of adder 110 is provided with the middle 11 bits (bits 4–14)of the generation number 28, the second input with the bits 4–8 of register 92, and the third input with the middle 5 bits (bits 4–8) of the second data 32. Adder 110 adds these three input values (regarding them as signed integers) and applies the result of addition to the second input of switch 104. The first input of switch 104 is provided with the middle 11 bits of the generation number 28. Switch 104 selectively outputs the output of adder 110 when coincidence detection circuit 96 detects a coincidence with any of the above described three base offset storing instruction, of the wide range offset reading instruction, or the wide range offset writing instruction, otherwise it outputs the middle 11 bits of the generation number 28.

Adder 112 has its first input provided with the lowermost 10 bits of the generation number 28, its second input with bits 9–12 of register 94, and its third input with the lowermost 4 bits of the second data 32. Adder 112 adds these three input values (regarding them as signed integers) and applies the result of addition to the second input of switch 106. The first input of switch 106 is provided with the lowermost 10 bits of the generation number 28. Switch 106 selectively outputs the output of adder 112 when coincidence detection circuit 96 detects any of the above-described three base offset storing instructions, wide range reading offset reading instruction, or the wide range offset writing instructions; otherwise it outputs the lowermost 10 bits of the input generation number 28.

The operation of input scrambler 84 as illustrated in FIG. 18 is roughly divided into a usual operation, an operation for setting base offsets, and an operation of wide range offset accessing.

Hereinafter these operations will sequentially be described.

In the case of usual operation, the connection of input scrambler 84 is as follows. Coincidence detection circuit 96 detects the instruction code 26 not being in coincidence with any of the three base offset storing instructions, wide range offset reading instruction, and wide range offset writing instruction. Switches 100, 102, 104, and 106 are controlled selectively output respective first inputs, because a coincidence detection signal is not output from coincidence detection circuit 96. Accordingly, the instruction code of the input data packet is output as the instruction code, the generation number of the data input data packet as the generation number, and the first and second data of the input data packet, respectively, are output first data and the second data. Therefore, input scrambler 84 is equivalent to that shown in FIG. 8. The operation of the memory interface at the time has already been described. Therefore detailed description thereof will not be repeated here.

The base offset storing operation can further be divided into a base field offset storing processing, a base line offset storing processing, and a base pixel offset storing processing.

These processings will be sequentially described.

In the case of the base field offset storing processing, the base field offset storing instruction is input as the instruction code 26. Coincidence detection circuit 96 outputs a detection signal upon detecting the base field offset storing instruction, and causes instruction code generation circuit 98 to generate a no operation instruction. Switch 100 is switched to select the second input. Accordingly, input scrambler 84 outputs the no operation instruction. Coincidence detection circuit 96 further detects a coincidence With the base field offset storing instruction and controls register 90 of the three registers 90, 92, and 94 to store the first data 30. It is assumed that the first data 30 includes the base field offset. The base field offset will be stored in register 90 as a result. At this time, switches 102, 104, and 106 are also switched to select their first inputs. It is noted that at this time, since the instruction applied to memory accessing circuit 2 is the no operation instruction as described above, data output from these three switches 102, 104, and 106 are actually meaningless. Switching of switches 102, 104, and 106 is therefore not limited to the above.

Similarly, when the base line offset and base pixel offset are stored, the first data 30 is stored in each of registers 92 and 94. Accordingly, in each case, by setting to the first data to the base line offset and the base pixel offset, the base line offset and the base pixel offset will be stored in registers 92 and 94.

When the wide range offset reading instruction is applied to coincidence detection circuit 96 as the instruction code 26, coincidence detection circuit 96 detects this condition and generates a coincidence detection signal and applies the same to instruction code generation circuit 98. Instruction code generation circuit 98 generates a usual reading instruction in response to the coincidence detection signal. Switch 100 is controlled by coincidence detection circuit 96 to selectively output the output of instruction code generation circuit 98. Therefore, the usual reading instruction is applied to memory accessing circuit 2 (see FIG. 6) as the instruction code.

Meanwhile, a 3 bit field offset, a 5 bit line offset, and a 4 bit pixel offset as shown in FIG. 14 are stored in the second data 32 in this case. Adder 108 adds the uppermost 3 bits of the generation number 28, the base field offset stored in register 90 and the field offset formed of the uppermost 3 bits of the second data 32 and applies the result of addition to switch 102. Switch 102 is switched by coincidence detection circuit 96 and selectively outputs the output of adder 108 as the uppermost 3 bits of the generation number 28.

Similarly, adder 110 adds the middle 11 bits of the generation number 28, the base line offset stored in register 92, and the middle 5 bits of the second data 32 and applies the result of addition to the second input of switch 104. Switch 104 is controlled by coincidence detection circuit 96 to select the output of adder 110 and output the selected output as the middle 11 bits of the generation number.

Adder 112 adds the lowermost 10 bits of the generation number 28, the base pixel offset stored in register 94, and the lowermost 4 bits of the second data 32 and applies the result of addition to the second input of switch 106. Switch 106 is controlled by coincidence detection circuit 96 to select the output of adder 112 and output the selected output as the lowermost 10 bits of the generation number.

Accordingly, the generation number applied to memory accessing circuit 2 shown in FIG. 6 corresponds to the address represented by the original generation number and added with the wide range offsets shown in FIG. 16. Memory accessing circuit 2 (see FIG. 6) accesses the image memory according to the address added with the wide range offsets and outputs the result of reading as the data of the output data packet.

Therefore, if the memory interface incorporating input scrambler 84 shown in FIG. 18 is utilized, the point offsét by an arbitrary offset amount from an address designated by a generation number can be produced, and an accessing processing can be executed to its vicinity with the point in the center.

Wide range offset writing processing can be executed in the same manner as the above-described wide range offset reading processing. The wide range offset writing processing is substantially identical to the wide range offset reading instruction with essential differences being that data to be stored should be set in a desired address in the image memory as first data and the instruction generated by the instruction code generation circuit 98 should be a usual writing instruction.

As in the foregoing, utilizing the memory interface according to the fourth embodiment, not only a processing to the vicinity of an address designated by the generation number, but also a processing can be performed in the vicinity around the point moved from the address designated by the generation number by the an arbitrary offset amount. Furthermore, an operation suitable for video image processing can be executed because, if such wide range offset processing is not performed, memory accessing to an address decided based on the generation number can be performed.

It is noted that if base offsets to be stored in registers 90, 92, and 94 are all set to 0 in the fourth embodiment, an operation exactly the same as that of the memory interface according to the third embodiment is performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory interface responsive to a data packet including an instruction code field, an address field, and at least one data field for accessing a memory and outputting the result of said accessing, comprising:

means for receiving an external data packet;

means for converting the content of the address field of said received data packet into a converted address based on an instruction code and data, both of which are included in the received data packet; and accessing means for accessing said converted address in said memory, executing a processing determined by the instruction code of said received data packet and outputting the result of said processing;

wherein said conversion means includes:

coincidence detection means for detecting whether an instruction code of said received data packet is in coincidence with a first instruction code, and outputting a first coincidence detection signal when coincidence is detected, and first selection means for applying as an address of said accessing means the content of the data field of said received data packet when said first coincidence signal is output, or the content of the address field of said received data packet at other times.

2. The memory interface as recited in claim 1, wherein said conversion means further includes:

means for generating a second instruction code; and second selection means for applying as an output thereof said second instruction code when said first coincidence signal is output, or the content of the instruction code of said received data packet at other times.

3. The memory interface as recited in claim 2, further comprising means for outputting an output data packet including the result of accessing output by said accessing means, an address included in said received data packet, and the output of said second selection means.

4. A memory interface responsive to a data packet including an instruction code field, an address field, and at least one data field for accessing a memory and outputting the result of said accessing, comprising:

means for receiving an external data packet;

means for converting the content of the address field of said received data packet into a converted address based on an instruction code and data, both of which are included in the received data packet; and accessing means for accessing said converted address in said memory, executing a processing determined by the instruction code of said received data packet and outputting the result of said processing;

wherein said conversion means includes:

coincidence detection means for detecting whether an instruction code of said received data packet is in coincidence with any of a table reading instruction, an address storage instruction, and a table writing instruction, and for providing multiple outputs of prescribed coincidence detection signals;

storing means, receiving an output from said coincidence detection means, for storing at least a part of the content of the data field of said received data packet when a first coincidence detection signal is output, and for outputting the stored data upon request;

means, receiving an output from said coincidence detection means, for selectively generating a respective one of a plurality of instruction codes, depending on which one of prescribed coincidence signals is received, and for providing an output of said generated instruction code;

said memory interface further including first selection means, controlled by an output of said coincidence detection means, for outputting either at least part of the content of the address field of said received data packet, at least part of the content of the data field of said received data packet, or the output of said storing means;

second selection means, controlled by an output of said coincidence detection means, for outputting either the remaining part of the content of the address field of said received data packet or the remaining part of the content of the data field of said received data packet; and third selection means, controlled by an output of said coincidence detection means, for applying as an instruction code to said accessing means either the instruction code of said received data packet or said generated instruction code;

wherein the output of said first selection means and the output of said second selection means are applied to said accessing means as an address.

5. The memory interface as recited in claim 4, further comprising means for outputting a data packet including the result of accessing output by said accessing means, an address included in said received data packet, and the instruction code output by said third selection means.

6. The memory interface as recited in claim 4, wherein said accessing means has an address input of a plurality of uppermost bits and a plurality of lowermost bits, the output of said first selection means providing said plurality of uppermost bits and the output of said second selection means providing said plurality of lowermost bits.

7. A memory interface responsive to a data packet including an instruction code field, an address field, and at least one data field for accessing a memory and outputting the result of said accessing, comprising:

means for receiving an external data packet;

means for converting the content of the address field of said received data packet into a converted address based on an instruction code and data, both of which are included in the received data packet; and accessing means for accessing said converted address in said memory, executing a processing determined by the instruction code of said received data packet and outputting the result of said processing;

wherein said conversion means includes:

coincidence detection means for detecting whether the instruction of said received data packet is in coincidence with a first instruction code and for generating a first coincidence detection signal when coincidence occurs;

operation means for performing an arithmetic operation using the content of the address field of said received data packet and the content of the data field of said received data packet; and first selection means, responsive to said first coincidence detection signal, for outputting, as an address to said accessing means, the output of said operation means when said first coincidence detection signal is generated, and for outputting the content of the address field of the received data packet at other times.

8. The memory interface as recited in claim 7, wherein said arithmetic operation means performs algebraic addition.

9. The memory interface as recited in claim 8, wherein said conversion means further includes:

means for generating a prescribed second instruction code; and second selection means for applying said second instruction code to an output thereof when said first coincidence detection signal is generated, and for applying the instruction code of the received data packet as an output thereof at other times.

10. The memory interface as recited in claim 8, wherein said data packet includes a first data field and a second data field, both having the same number of bits, and said first selection means is connected to receive the content of said second data field at one of its inputs.

11. The memory interface as recited in claim 10, wherein:

said address field and said second data field both include uppermost bits, middle bits, and lowermost bits;

said arithmetic operation means includes first, second, and third adders which each has two input sources, said first adder having as inputs the three uppermost bits of said address field and the three uppermost bits of said second data field, said second adder having as inputs the next 11 bits of said address field and the next 5 bits of said second data field, and said third adder having as inputs the 10 lowermost bits of said address field and the 4 lowermost bits of said second data field;

said first selection means includes uppermost bit selection means for outputting the 3-bit output of said first adder when said first coincidence detection signal is generated, and the three uppermost bits of the address field at other times;

middle bit selection means for outputting the 11-bit output of said second adder when said first coincidence detection signal is generated, and the next 11 bits of the address field at other times;

lowermost bit selection means for outputting the 10-bit output of said third adder when said first coincidence detection signal is generated, and the 10 lowermost bits of the address field at other times; and the output of said uppermost bit selection means, the output of said middle bit selection means, and the output of said lowermost bit selection means constitute the uppermost bits, middle bits, and lowermost bits, respectively, of an address applied to said accessing means.

12. The memory interface as recited in claim 11, wherein said memory includes a plurality of field memories, each having a first storage capacity, each said field memory including a plurality of line memories, each line memory having a second storage capacity, the uppermost bits of said address field are for selecting one of said plurality of field memories, the middle bits of said address field are for selecting one of said plurality of line memories in the selected field memory means, and the lowermost bits of said address field are for selecting a particular one of multiple storage units in the selected line memory.

13. A memory interface responsive to a data packet including an instruction code field, an address field, and at least one data field for accessing a memory and outputting the result of said accessing, comprising:

means for receiving an external data packet;

means for converting the content of the address field of said received data packet into a converted address based on an instruction code and data, both of which are included in the received data packet; and accessing means for accessing said converted address in said memory, executing a processing determined by the instruction code of said received data packet and outputting the result of said processing;

wherein said data packet includes at least two data fields, and said conversion means includes coincidence detection means for detecting a coincidence between the instruction code of the received data packet and either a first or second instruction code and outputting either a first or second coincidence detection signal, respectively, means, connected to receive the content of said at least one data field of said received data packet and responsive to said first coincidence detection signal, for storing and outputting the content of said at least one data field of said data packet, operation means for performing a prescribed operation to the content of the address field of said received data packet, to the output of said storing means, and to the content of at least part of the second data field of said received data packet, and first selection means, responsive to said second coincidence detection signal, for selectively applying as an address to said accessing means either the content of the address field of said received data packet or the output of said operation means.

14. The memory interface as recited in claim 13, wherein said operation means performs algebraic addition.

15. The memory interface as recited in claim 14, wherein said conversion means further includes means for generating a prescribed third instruction code; and wherein said memory interface further includes second selection means, for applying either the instruction code of said received data packet or said third instruction code as an instruction code to said accessing means.

16. The memory interface as recited in claim 15, wherein said generation means includes means, responsive to said first coincidence detection signal, for generating a "no operation" instruction which corresponds to said third instruction code.

17. The memory interface as recited in claim 15, wherein said third instruction code is a "no operation" instruction.

18. The memory interface as recited in claim 13, wherein:

said data packet includes a first said data field and a second said data field both having the same number of bits, said storing means are connected to receive the content of said first data field, and said first selection means are connected to receive, at one of its inputs, the content of said second data field.

19. The memory interface as recited in claim 18, wherein:

said address field and said first and second data fields each include uppermost bits, middle bits, and lowermost bits;

said storing means includes uppermost bit storing means, middle bit storing means, and lowermost bit storing means for storing said uppermost bits, said middle bits, and said lowermost bits of said first data field, respectively; and said operation means includes uppermost bit operation means for performing said prescribed operation between the uppermost bits of said address field of said received data packet, the output of said uppermost bit storing means, and the uppermost bits of said second data field, middle bit operation means for performing said prescribed operation between the middle bits of said address field of said received data packet, the output of said middle bit storing means, and the middle bits of said second data field, and lowermost bit operation means for performing said prescribed operation between the lowermost bits of said address field of said received data packet, the output of said lowermost bit storing means, and the lowermost bits of said second data field.

20. The memory interface as recited in claim 19, wherein said prescribed memory includes a plurality of field memories having the same storage capacity, each said field memory includes a plurality of line memories having the same storage capacity, the uppermost bits of said address field are for selecting one of said plurality of field memories, the middle bits of said address field are for selecting one of said plurality of line memories in the selected field memory, and the lowermost bits of said address field are for selecting one of multiple storage units in the selected line memory.

21. The memory interface as recited in claim 20, wherein said first selection means includes:

uppermost bit selection means, for outputting the output of said uppermost bit operation means when said second coincidence detection signal is generated, and the uppermost bits of the address field of said received data packet at other times;

middle bit selection means, for outputting the output of said middle bit operation means when said second coincidence detection signal is generated, and middle bits of the address fields of said received data packet at other times;

lowermost bit selection means for outputting the output of said lowermost bit operation means when said second coincidence detection signal is generated, and lowermost bits of the address field of said received data packet at other times; and the output of said uppermost bit selection means, the output of said middle bit selection means, and the output of said lowermost bit selection means constitute the uppermost bits, the middle bits, and the lowermost bits, respectively, of an address applied to said accessing means.

* * * * *